W. C. GIFFORD.
Hay Spreader.

No. 45,992.  Patented Jan. 24, 1865.

Witnesses:
Henry Morris
Geo. W. Reed

Inventor:
W. C. Gifford
per Munn & Co
attorneys

UNITED STATES PATENT OFFICE.

W. C. GIFFORD, OF JAMESTOWN, NEW YORK.

IMPROVEMENT IN HAY-SPREADERS.

Specification forming part of Letters Patent No. 45,992, dated January 24, 1865.

*To all whom it may concern:*

Be it known that I, W. C. GIFFORD, of Jamestown, in the county of Chautauqua and State of New York, have invented a new and Improved Hay-Spreader; and I do hereby declare that the following is a full, clear, and exact description thereof, which will enable others skilled in the art to make and use the same, reference being had to the accompanying drawings, making a part of this specification, in which—

Figure 1:
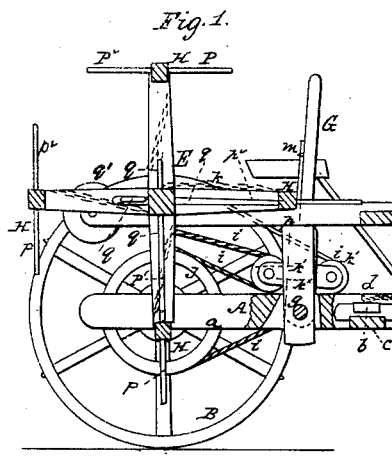
Figure 2:
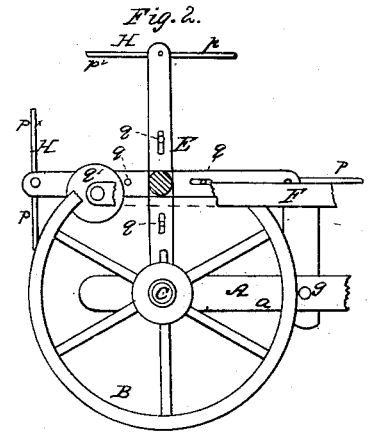
Figure 3:
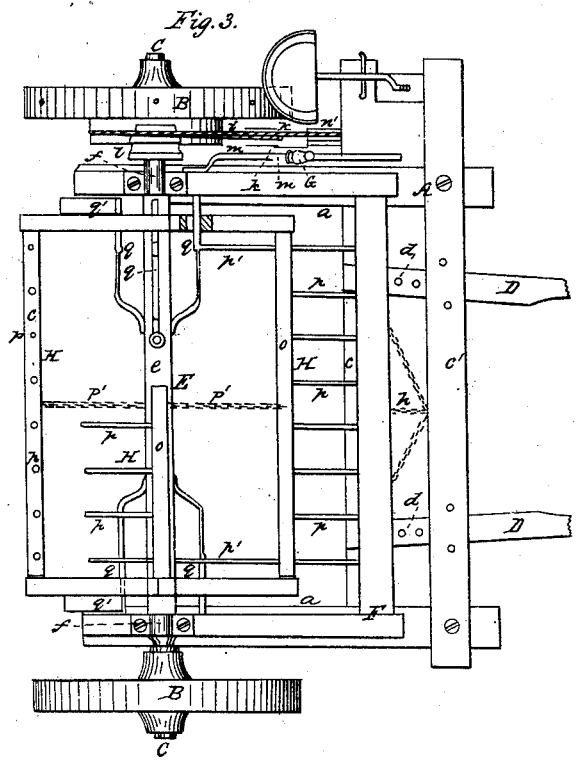
Figure 4:
Figure 5:
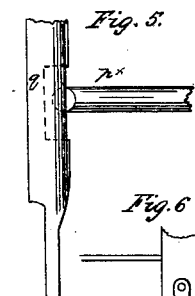
Figure 6:
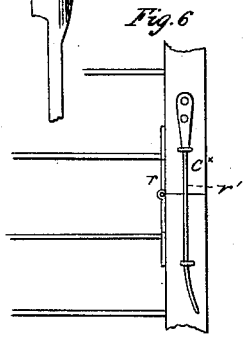

Figure 1 represents a longitudinal vertical section of my invention, taken in the plane indicated by the line $x\ x$, Fig. 3. Fig. 2 is a sectional side elevation of the same. Fig. 3 is a plan or top view of the same. Figs. 4 and 5 are detached views of the mechanism for releasing the teeth on a larger scale than the previous figures. Fig. 6 is a detached side elevation of one of the rails of the reel, showing the mechanism used for rendering the teeth yielding.

Similar letters of reference indicate like parts.

This invention relates to certain improvements in machines for turning and spreading hay which act on the hay by means of a revolving reel, the rails of which are provided with suitable teeth to take up, turn, and spread the hay as the machine is drawn over the field.

The nature of my invention and its peculiar advantages will be readily understood from the following description.

A represents the main frame of my machine, which is constructed with side timbers, $a$, having axles C attached upon their outer sides and near to their back ends. Said timbers are connected together at their front ends by two cross-bars, $c\ c'$, halved into them, one from above and the other from below, in such a manner as to make the frame very strong, and affording convenient means of attaching the tongue or thills. The frame A is supported by two wheels, B, and the draft-pole or thills D are attached to the same by means of iron strap-staples $b\ b'$, secured to the under surface of the cross-bar $c'$, and by similar staples to the upper side of the cross bar $c$, in such a manner that they can be easily and expeditiously removed or exchanged. The draft-pole or thills are fastened in their sockets by means of pins $d$, passing through holes in the staples $h$ and through corresponding holes in the draft-pole or thills and in the cross-bar $c$, and by making two or more holes in the draft-pole or thills the latter can be lengthened or shortened, so as to adapt them to any length of trace.

E is the spreading-reel, the axle $e$ of which has its bearings directly above the axles of the wheels B, so that its relative distance from the ground may always be the same, or that it may rise and fall with the wheels, and thereby adapt itself to the unevenness of the ground more perfectly than it could if it were placed either forward or back of the wheels.

The bearings of the axle $e$ of the reel are in boxes $f$, which are secured to a tilting frame, F, in such a position that by tilting said frame the reel can be adjusted to any desired height from the ground. The tilting frame F has its bearings on pivots $g$, secured in the longitudinal timbers of the main frame A in such a manner that the reel will be held down to its work by its own weight and yet be free to rise over any obstructions. A chain, $h$, which extends from the front cross-bar of the main frame to the front cross-bar of the tilting frame serves to adjust the reel to any desired height from the ground, and by shortening this chain the reel can be raised from the ground and held there in order to move the machine from one field to another.

The reel E is rotated by means of a belt, $i$, which extends from a drum, $j$, secured to one of the wheels B round two pulleys, $k\ k'$, and over a pulley, $l$, on the end of the axle of the reel. The pulleys $k\ k'$ are secured to a short cross-bar, $k^\times$, which is attached to a hand-lever, G, in such a position that the frame can be tilted up or down without altering the length of the belt, and at the same time by the use of the additional pulleys $k\ k'$ the benefit of a long belt is secured.

The hand-lever G, which serves to tilt the frame F has its fulcrum on the same pivot with the tilting frame, and it is connected with said frame by means of a serrated rod, $m$, and sliding catch $m'$. By means of this catch and serrated bar the belt $i$ can be stretched whenever it may be deemed necessary.

The reel E rotates on the horizontal axle $e$, and it is provided with four (more or less) rakes, H. The rake heads or rails $o$ are secured to the arms of the reel by means of pivots, so that they revolve freely, and the teeth $p$ are retained in the desired working position by means of chains $p'$, extending from the axle $e$ to the rake-heads, and by teeth $p^*$ at their ends, extending through them and nearly to the center shaft, where they are held in position by spring-stops $q$ while the teeth $p$ operate on the hay, and released by rollers or cams $q'$, depressing the spring-stops $q$ at the proper points for the purpose of unloading the hay. A ratchet and pawl applied to the end of the rakes prevent them from turning in the wrong direction. The action of the teeth $p^*$ and spring-stops $q$ is clearly represented in Figs. 4 and 5 of the drawings, and by following the motion of the reel it will be noticed that the rakes may either be made to turn outward or to swing through the center, according to the mechanism employed to hold them in the desired position.

The rake-heads are either made solid from end to end, or they may be made out of two or more parts connected by hinges $r$ (see Figs. 6) and springs $r'$, which operate in such a manner as to keep the rake in a straight position and yet allow it to bend freely and accommodate itself to uneven ground.

If desired, the reel may be so constructed by means of a ratchet-wheel and pawl that it is prevented from rotating in the wrong direction.

By the aid of this machine the work of spreading and turning hay is greatly facilitated and much labor and time is saved to the farmer, the self-discharging rakes prevent the hay from winding upon the reel, and each rake unloads precisely at the desired point.

The operation of the machine is very simple and requires no attention, and all the parts are so constructed that they are not liable to get out of repair.

What I claim as new, and desire to secure by Letters Patent, is—

1. The draft-pole or thills D, provided with a series of holes, $d$, and operating in combination with the pins $c'$, loops $b\ b'$, and cross-bars $c\ c'$ of the frame A, in such a manner that the same can be readily taken out and changed or lengthened or shortened, as may be desirable.

2. The combination of the tilting frame F with the reel E and chain $h$, substantially as and for the purposes shown and described.

3. The hand-lever G, in combination with the belt $i$ and tilting frame F, applied as herein set forth, so that by touching the hand-lever the belt and lever combined will raise or lower the frame.

4. The serrated bar $m$ and catch $m'$, in combination with the lever G and belt $i$, as and for the purposes specified.

5. The rakes H, provided with teeth $p\ p^*$, and applied to the reel E, in combination with the chains $p'$, spring-stops $q$, and cams $q'$, or their equivalents, constructed and operating substantially as and for the purpose shown and described.

W. C. GIFFORD.

Witnesses:
W. H. SPRAGUE,
HARVEY W. TEW.